United States Patent [19]
Tazumi et al.

[11] Patent Number: 5,539,844
[45] Date of Patent: Jul. 23, 1996

[54] BALL BEARING CAGES AND BALL BEARINGS

[75] Inventors: Hajime Tazumi; Masayuki Kitamura; Hiroshi Ueno, all of Osaka; Tsuyoshi Okumura; Shigetaka Ashida, both of Nara, all of Japan

[73] Assignee: Koyo Seiko Co., Ltd., Osaka, Japan

[21] Appl. No.: 389,994

[22] Filed: Feb. 17, 1995

[30] Foreign Application Priority Data

Feb. 18, 1994 [JP] Japan .................................. 6-021556
Jul. 28, 1994 [JP] Japan .................................. 6-177090

[51] Int. Cl.⁶ ................................................. F16C 33/41
[52] U.S. Cl. ................................................. 384/531
[58] Field of Search ................................ 384/531, 532, 384/527, 534, 580, 575

[56] References Cited

U.S. PATENT DOCUMENTS 2,038,095  4/1936  Bott ........................................ 384/531
4,040,687  8/1977  Rogers .................................... 384/531
4,169,636  10/1979  Hooper ................................... 384/531
4,938,613  7/1990  Griffin et al. ........................... 384/531

*Primary Examiner*—Lenard A. Footland
*Attorney, Agent, or Firm*—Popham, Haik, Schnobrich & Kaufman, Ltd.

[57] ABSTRACT

A ball bearing cage is formed with pockets each having an inwardly curved spherical pocket face similar to a ball in shape. At least one of the pockets has a protrusion projecting inwardly thereof from one of inner and outer circumferential edge portions of the pocket face. A ball bearing comprises balls retained between inner and outer bearing rings and equispaced circumferentially thereof by a cage. The cage is formed with pockets each having an inwardly curved spherical pocket face similar to the ball in shape, at least one of the pockets having a protrusion projecting inwardly thereof from an edge portion of the face close to the fixed one of the rings.

18 Claims, 11 Drawing Sheets

BALL BEARING CAGES AND BALL BEARINGS

BACKGROUND OF THE INVENTION

The present invention relates to cages for use in ball bearings which are useful, for example, for motor vehicle components, such as tensioners and electromagnetic clutches, and electric devices such as hard discs, fan motors and cleaners.

Ball bearing cages heretofore used are made of plastics or metal and are crown-shaped cages, ribbon-type pressed cages or annular molded cages. These cages are formed with a plurality of pockets each having an inwardly curved spherical face which is similar to the ball in shape and slightly greater than the ball in the radius of curvature. The pockets in the molded cage are each in the form of a through hole.

However, the conventional cages have the problem of causing the ball bearing to give off a noise during rotation when a highly viscous lubricant is applied to the ball bearing to prolong the life thereof or when the bearing is designed for high-speed rotation.

Accordingly, we have conducted various experiments and research to trace the cause for producing the noise and found that the noise is attributable to the following reason. When the rotatable ring of the ball bearing rotates relative to the fixed ring thereof, each ball is in sliding contact with the pocket face of the cage. With reference to FIG. 24, at a front portion of the rotatable ring 42 with respect to the direction of rotation thereof, the ball 40 which is revolving while rotating about its own axis pushes the pocket face 41, forming between the surface of the ball 40 and the pocket face 41 a clearance C which is generally uniform from the rotatable ring side toward the fixed ring (43) side. If the clearance C diminishes from a predetermined value in the case where the lubricant has a high viscosity or the rotatable ring 42 is in rotation at a high speed, the viscosity resistance of the lubricant present between the ball 40 and the pocket face 41 increases, offering greater resistance to the sliding contact to result in a noise.

Another problem is also encountered in that the increased resistance to the sliding contact stated above makes the ball bearing require higher torque for rotation. The increased resistance to the sliding contact further entails the problem of heating the lubricant to a high temperature to shorten the life of the lubricant.

SUMMARY OF THE INVENTION

An object of the present invention is to provide a ball bearing cage which is free of the above problems and a ball bearing having the cage incorporated therein.

The present invention provides a cage for use in ball bearings which is formed with a plurality of pockets each having an inwardly curved spherical pocket face similar to a ball in shape, at least one of all the pockets having a protrusion projecting inwardly thereof from one of inner and outer circumferential edge portions of the pocket face.

According to an aspect of the invention, the cage is in the form of a crown, and the protrusion is formed at the innermost portion of the pocket.

According to another aspect of the invention, the cage is an annular molded cage, and the plurality of pockets are each in the form of a through hole, the protrusion being formed at one end of the pocket with respect to an axial direction of the cage.

According to another aspect of the invention, the cage is made of an injection molding of plastics.

According to another aspect of the invention, the cage is a ribbon-type pressed cage, and the protrusion is formed at one end of the pocket with respect to an axial direction of the cage. In this case, the cage may be made of metal.

According to another aspect of the invention, the protrusion is formed at each of opposite sides of a plane extending through the center of the pocket and parallel to the axis of the cage.

The present invention further provides a ball bearing comprising a plurality of balls retained between inner and outer bearing rings and equispaced circumferentially thereof by a cage, the cage being formed with a plurality of pockets each having an inwardly curved spherical pocket face similar to the ball in shape, at least one of all the pockets having a protrusion projecting inwardly thereof from an edge portion of the pocket face close to the fixed one of the inner and outer rings.

According to another aspect of the invention, the cage of the ball bearing is in the form of a crown, and the protrusion is formed at the innermost portion of the pocket.

According to another aspect of the invention, the cage of the ball bearing is an annular molded cage, and the plurality of pockets are each in the form of a through hole, the protrusion being formed at one end of the pocket with respect to an axial direction of the cage.

According to another aspect Of the invention, the cage of the ball bearing is made of an injection molding of plastics.

According to another aspect of the invention, the cage of the ball bearing is a ribbon-type pressed cage, and the protrusion is formed at one end of the pocket with respect to an axial direction of the cage. In this case, the cage may be made of metal.

According to another aspect of the invention, the protrusion is formed at each of opposite sides of a plane extending through the center of the pocket and parallel to the axis of the cage.

With the ball bearing cage of the present invention, at least one of all the pockets has a protrusion projecting inwardly thereof from one of inner and outer circumferential edge portions of the pocket face. Therefore, in the case where a ball bearing is so assembled with use of the cage that the fixed ring is positioned alongside the circumferential edge portion having the protrusion, and when the rotatable ring of the bearing is rotated relative to the fixed ring, the edge portion of the pocket face close to the rotatable ring comes into contact with the ball at a front portion of the ring with respect to the direction of its rotation, and at this portion, the clearance between the pocket face and the ball gradually increases from the rotatable ring side toward the fixed ring side. Accordingly, at the front portion of the rotatable ring with respect to the direction of rotation of this ring, the lubricant adhering to the ball outside the pocket is partly scraped off by the pocket face edge portion adjacent to the rotatable ring. The portion of lubricant ingressing into the clearance rapidly passes through the clearance and egresses therefrom toward the fixed ring. Consequently, the clearance between the ball surface and the pocket face becomes approximately uniform from the rotatable ring side toward the fixed ring side, such that the sliding contact of the ball with the pocket face in the presence of lubricant encounters smaller resistance than in the conventional bearing wherein the lubricant is present therebetween. The reduction of the resistance to the sliding contact of the ball with the pocket face precludes production of noise. Additionally, the reduced resistance to the sliding contact lowers the torque required for the rotation of the ball bearing, further preventing the lubricant from becoming heated to a high temperature to give a prolonged life to the lubricant.

When the ball bearing cage is in the form of a crown, and the protrusion is formed at the innermost portion of the pocket, the protrusion precludes production of noise irrespective of the direction of rotation of the rotatable ring. If the protrusion is not positioned at the innermost portion of the pocket, it is only when the rotatable ring is rotated in one direction that the production of noise can be prevented.

In the case where the ball bearing cage is a ribbon-type pressed cage, or an annular molded cage wherein the plurality of pockets are each in the form of a through hole, and the protrusion is formed at one end of the pocket with respect to the axial direction of the cage, the protrusion precludes production of noise regardless of the direction of rotation of the rotatable ring. If the protrusion is not positioned at the end of the pocket, it is only when the rotatable ring is rotated in one direction that the production of noise can be precluded.

When the protrusion in the ball bearing cage is formed at each of opposite sides of a plane extending through the center of the pocket and parallel to the axis of the cage, the protrusions preclude production of noise regardless of the direction of rotation of the rotatable ring.

In the ball bearing of the invention, the cage is formed with a plurality of pockets each having an inwardly curved spherical pocket face similar to the ball of the bearing in shape, at least one of all the pockets having a protrusion projecting inwardly thereof from an edge portion of the pocket face close to the fixed one of the inner and outer rings of the bearing. When the rotatable one of these rings is rotated relative to the fixed ring, the edge portion of the pocket face close to the rotatable ring contacts the ball at a front portion of the ring with respect to the direction of rotation thereof, and at this portion, the clearance between the pocket face and the ball gradually increases from the rotatable ring side toward the fixed ring side. Accordingly, at the front portion of the rotatable ring with respect to the direction of rotation of this ring, the lubricant adhering to the ball outside the pocket is partly scraped off by the pocket face edge portion adjacent to the rotatable ring. The portion of lubricant ingressing into the clearance rapidly passes through the clearance and egresses therefrom toward the fixed ring. Consequently, the clearance between the ball surface and the pocket face becomes approximately uniform from the rotatable ring side toward the fixed ring side, such that the sliding contact of the ball with the pocket face in the presence of lubricant encounters smaller resistance than in the conventional bearing wherein the lubricant is present therebetween. The reduction of the resistance to the sliding contact of the ball with the pocket face precludes production of noise. Additionally, the reduced resistance to the sliding contact lowers the torque required for the rotation of the ball bearing, further preventing the lubricant from becoming heated to a high temperature to give a prolonged life to the lubricant.

DESCRIPTION OF THE PREFERRED EMBODIMENTS

Figure 1:
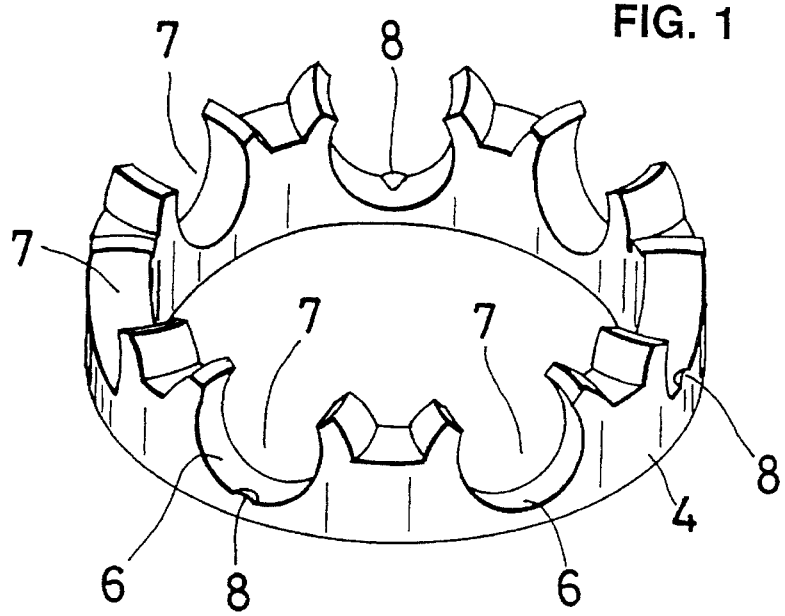
FIG. 1 is perspective view showing a cage as Embodiment 1 of the invention.

Throughout all the drawings, like parts are designated by like reference numerals.

Embodiment 1

FIGS. 1 to 5 show this embodiment, i.e., a cage of the invention which is in the form of a crown and is used in a ball bearing of the invention having a rotatable inner ring.

Figure 2:
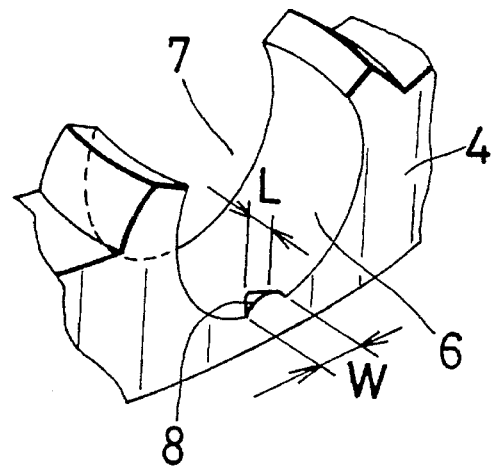
FIG. 2 is an enlarged fragmentary view of FIG. 1.
Figure 3:
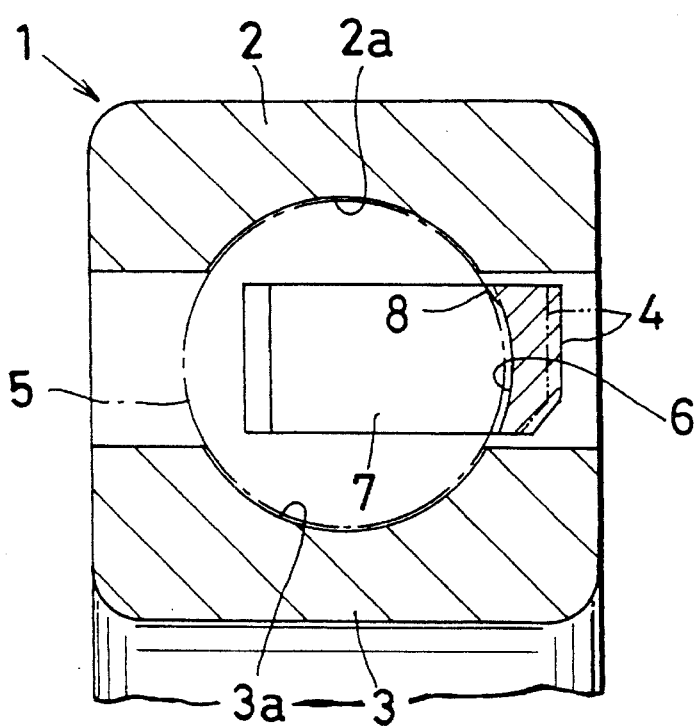
FIG. 3 is a fragmentary view in vertical section of a ball bearing of the invention wherein the cage of Embodiment 1 is used.
Figure 4:
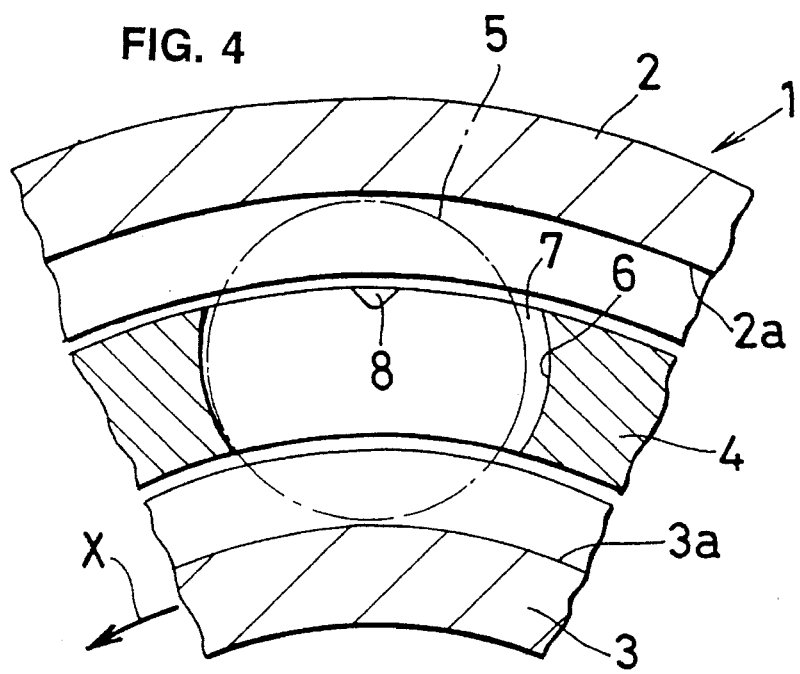
FIG. 4 is a fragmentary view in cross section of the bearing.
Figure 5:
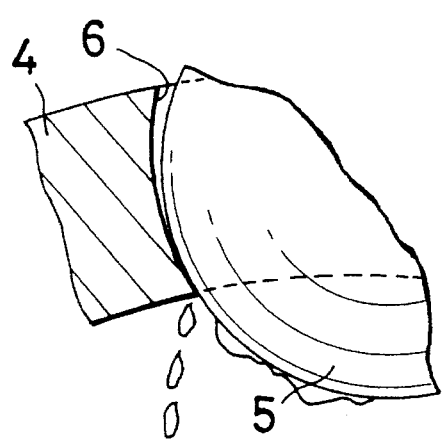
FIG. 5 is an enlarged fragmentary view of FIG. 4.

More specifically, FIGS. 1 and 2 show the cage of the invention, and FIGS. 3 to 5 show the ball bearing of the invention having the cage incorporated therein.

With reference to FIGS. 3 and 4, the ball bearing 1 comprises an outer ring 2 which is a fixed ring, rotatable inner ring 3, crown-shaped cage 4 made of injection molding of plastics such as nylon 6,6, and a plurality of balls 5 held by the cage 4 and arranged between the inner and outer rings 3, 2.

As shown in FIGS. 1 and 2, the cage 4 is formed with a plurality of pockets 7 each having an inwardly curved spherical pocket face 6 which is similar to the ball 5 in shape and slightly greater than the ball 5 in the radius of curvature. Of all the pockets 7, circumferentially spaced pockets 7 each have a protrusion 8 projecting inwardly thereof and formed on the innermost part of the pocket face 6 integrally therewith at the edge portion thereof close to the outer ring 2.

When seen from the opening side of the pocket 7, the protrusion is in the form of a triangle having a base on the outer ring side. The protrusion 8 has a height gradually decreasing from the outer ring (2) side toward the inner ring (3) side, and has a conical surface. Since the balls 5 are retained in raceway grooves 3a, 2a in the inner and outer rings 3, 2, the protrusions 8 act to position the cage 4 as axially displaced (see the solid line in FIG. 3) from the position thereof (see two-dots-and-dash line in FIG. 3) when the protrusions 8 are absent.

With reference to FIGS. 4 and 5, the inner ring 3 rotates in the direction of arrow X while the ball bearing 1 thus constructed is in use. At a front portion (on the left side in FIG. 4) of the inner ring 3 with respect to the direction of rotation of the ring 3, the edge portion of pocket face 6 of each pocket 7 adjacent to the inner ring 3 then comes into contact with the ball 5, and the clearance between the pocket face 6 and the ball 5 gradually increases from the inner ring (3) side toward the outer ring (2) side. Accordingly, at the front portion of the inner ring 3 toward the direction of rotation thereof, the lubricant adhering to the ball 5 outside the pocket 7 is partly scraped off by the pocket face edge portion adjacent to the inner ring 3. The portion of lubricant ingressing into the clearance rapidly passes through the clearance and egresses therefrom toward the outer ring 2. Consequently, the sliding contact of the ball 5 with the pocket face 6 in the presence of lubricant encounters reduced resistance, whereby generation of noise is precluded. Additionally, the reduced resistance to the sliding contact lowers the torque required for the rotation of the ball bearing 1, further preventing the lubricant from becoming heated to a high temperature to prolong the life of the lubricant.

With Embodiment 1 described, the position and the number of pockets 7 formed with the protrusion 8 can suitably be altered. In the case where the protrusion 8 is formed in only one pocket 7, the protrusion 8 is liable to wear away and becomes ineffective for preventing occurrence of noise, so that it is desired to form the protrusion 8 in a plurality of pockets 7.

Figure 6:
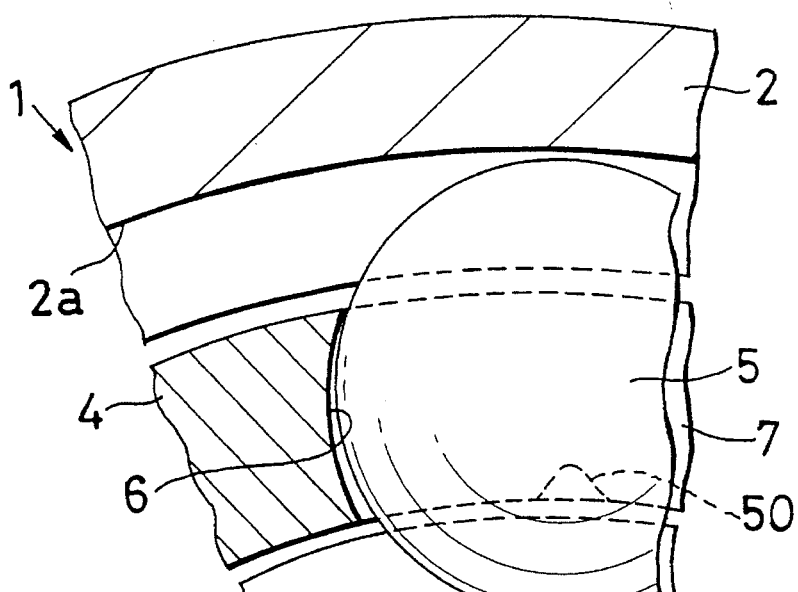
FIG. 6 is a fragmentary view in cross section of a ball bearing incorporating a cage wherein a protrusion is formed on a pocket face at an edge portion thereof adjacent to a rotatable ring.

FIG. 6 is a fragmentary view in cross section showing a ball bearing which has a cage 4 similar to Embodiment 1 but differs therefrom in the position of the protrusion. Of all the pockets 7, circumferentially spaced pockets 7 each have a protrusion 50 projecting inwardly thereof and formed on the innermost part of the pocket face 6 at its edge portion close to the rotatable ring, i.e., the inner ring 3. The inner ring 3 rotates in the direction of arrow X shown in FIG. 6. At a front portion (at left in FIG. 6) of the inner ring 3 toward the direction of rotation of the ring 3, the edge portion of pocket face 6 of each pocket 7 adjacent to the outer ring 2 then comes into contact with the ball 5, and the clearance between the pocket face 6 and the ball 5 gradually increases from the outer ring (2) side toward the inner ring (3) side. Accordingly the lubricant adhering to the ball 5 outside the pocket 7 readily ingresses into the clearance but is confined in the clearance since the pocket face edge portion adjacent to the outer ring 2 is in contact with the ball 5. This increases the resistance to the sliding contact of the ball 5 with the pocket face 6 in the presence of lubricant and renders the cage 4 susceptible to shearing resistance, causing the cage to give off a noise.

EXAMPLE 1

Figure 7:
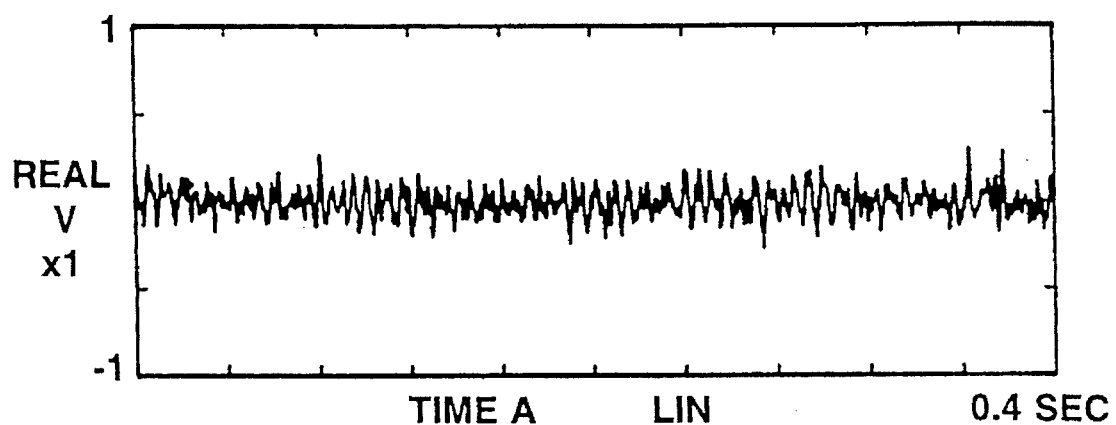
FIG. 7 is a graph showing the result of experiment of Example 1 achieved by a ball bearing wherein the cage of Embodiment 1 was used.

An experiment was conducted in this example using a ball bearing of Bearing No. 6303 wherein a cage 4 of Embodiment 1 was incorporated. The protrusion 8 was 0.24 mm in height, 1.47 mm in the circumferential width (indicated by W in FIG. 2) of its end adjacent to the outer ring 2, and 0.55 mm in radial length (indicated by L in FIG. 2). The inner ring 3 was rotated at 1800 r.p.m. using a high-viscosity grease having a consistency of 220 to 250 (25° C., 60 W) as lubricant, and the bearing was checked for acoustic characteristics by an acoustic tester. FIG. 7 shows the result.

COMPARATIVE EXAMPLE 1

Figure 8:
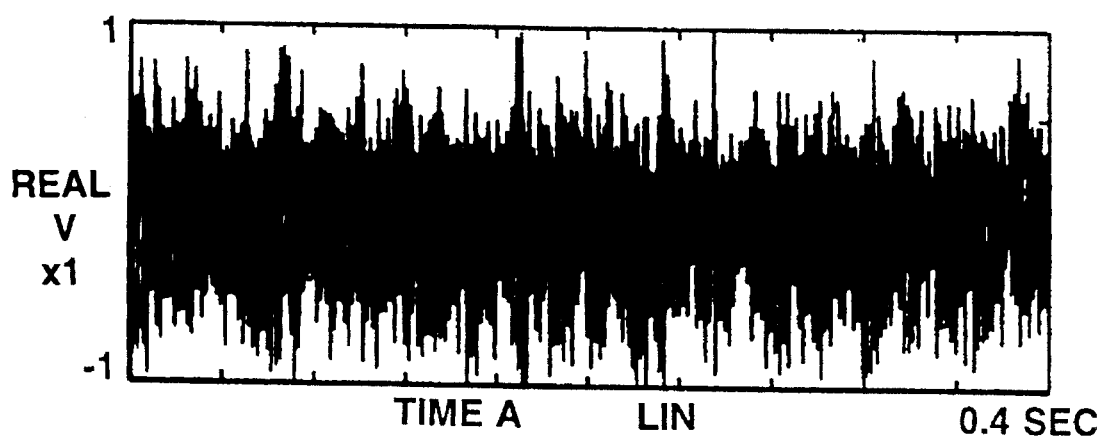
FIG. 8 is a graph showing the result of experiment of Comparative Example 1.

The same ball bearing as used in Example 1 except that the cage had no protrusion was checked for acoustic characteristics under the same condition as above. FIG. 8 shows the result.

EXAMPLE 2

Figure 9:
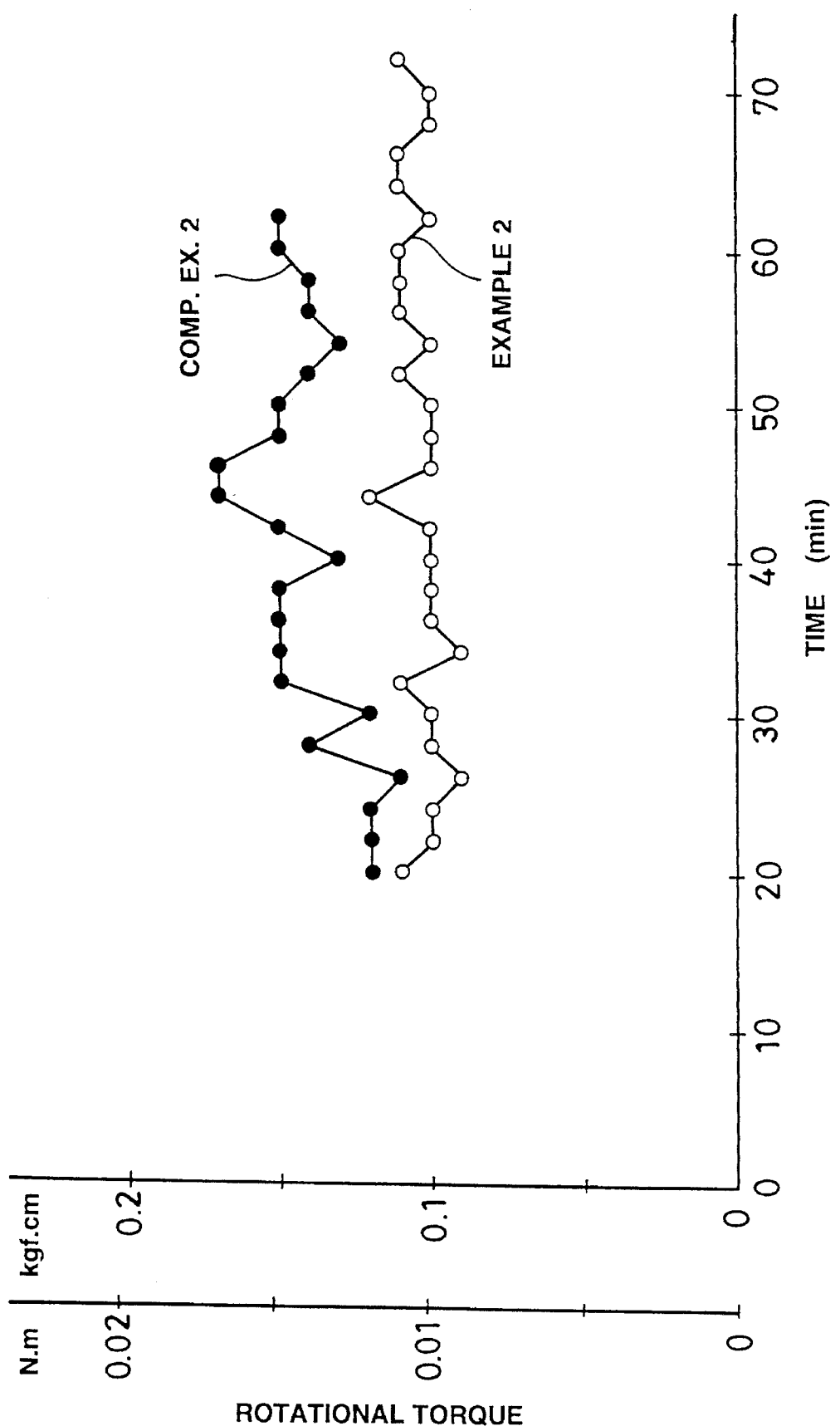
FIG. 9 is a graph showing the results of Example 1 and Comparative Example 2.

Used in this example was a ball bearing of Bearing No. 6204 having a radial internal clearance of +3 μm and including a cage 4 of Embodiment 1. The protrusion 8 was 0.27 mm in height, 1.60 mm in the circumferential width (see FIG. 2, W) of its end adjacent to the outer rig 2, and 0.60 mm in radial length (see FIG. 2, L). The lubricant used was a grease consisting of a base oil comprising an alkyl diphenyl ether (98.0 $mm^2/s$ in viscosity at 40° C., 11.95 $mm^2/s$ in viscosity at 100° C.) and 13.8 wt. % of a thickener comprising diurea. The inner ring 3 was attached to a drive shaft with the outer ring 2 made free to rotate, and the cage 4 was held out of rotation by a jig. The inner ring drive shaft was then driven at 2000 r.p.m. by a motor with a torque meter provided therebetween. At this time, the torque applied to the inner ring 3 rotates the balls 5 about their own axes, and the force of revolution of the balls acts to push the pocket faces 6 of the cage 4, whereas since the cage 4 is held against rotation, the balls 5 rotate about their own axes in position while pushing the pocket faces 6 of the cage 4 to rotate the outer ring 2 with the force of rotation. Accordingly, the total of the work required to drive the outer ring 2 and the work consumed by the frictional force between the balls 5 and the pocket faces 6 was measured as rotational torque. FIG. 9 shows the result.

When the pocket faces 6 of the cage 4 were observed after the experiment, it was found that a linear pattern of sliding movement was formed by the adhering grease, and that the ball was supported as by a point or line in the pocket with a suitable clearance present between the ball and the pocket face.

COMPARATIVE EXAMPLE 2

The same ball bearing as used in Example 2 except that the cage had no protrusion was tested to measure the rotational torque under the same conditions as above. The result is shown also in FIG. 9.

When the pocket faces of the cage were observed after the experiment, a decrease was found in the amount of grease applied, indicating that the ball was in face-to-face contact with the pocket face over a large area.

EXAMPLE 3

Figure 10:
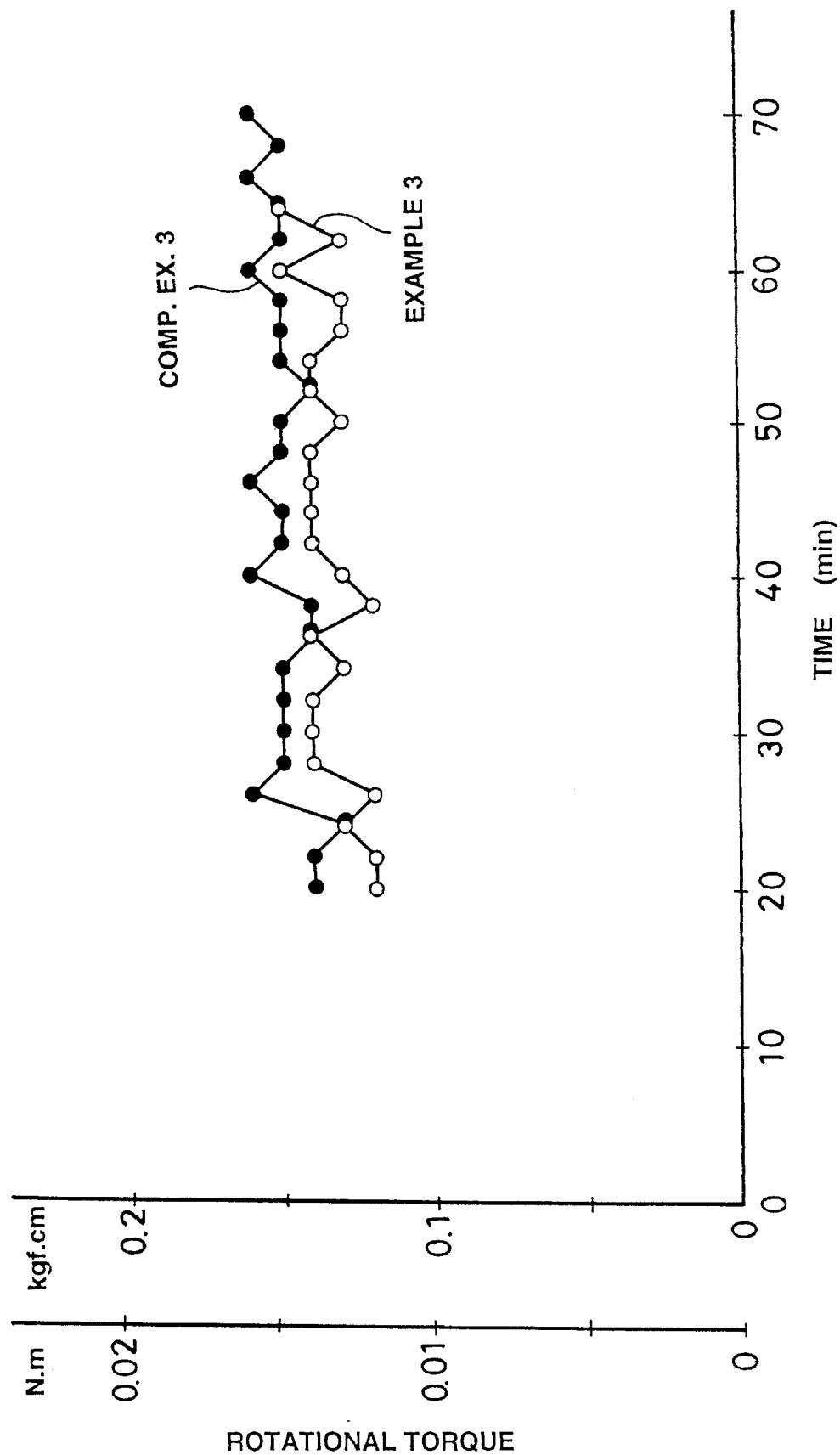
FIG. 10 is a graph showing the results of Example 3 and Comparative Example 3.

The same ball bearing as used in Example 2 except that the radial internal clearance was ±0 μm was tested to measure the rotational torque under the same conditions as above. The result is shown in FIG. 10.

COMPARATIVE EXAMPLE 3

The same ball bearing as used in Example 3 except that the cage had no protrusion was tested to measure the rotational torque under the same conditions as above. The result is shown also in FIG. 10.

EXAMPLE 4

Figure 11:
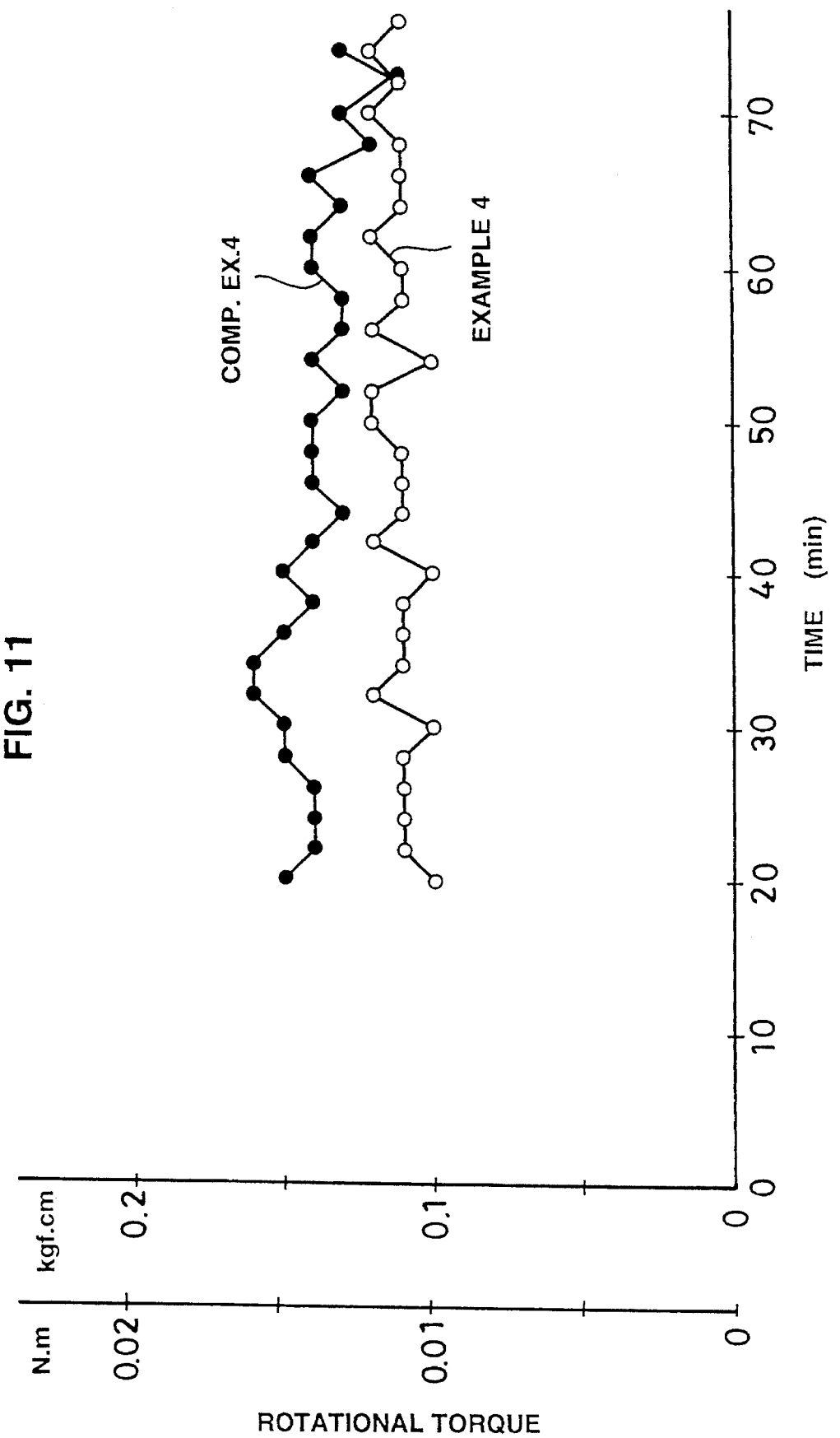
FIG. 11 is a graph showing the results of Example 4 and Comparative Example 4.

The same ball bearing as used in Example 2 except that the radial internal clearance was +4 μm was tested to measure the rotational torque under the same conditions as above. The result is given in FIG. 11.

COMPARATIVE EXAMPLE 4

The same ball bearing as used in Example 4 except that the cage had no protrusion was tested to measure the rotational torque under the same conditions as above. The result is given also in FIG. 11.

EXAMPLE 5

Figure 12:
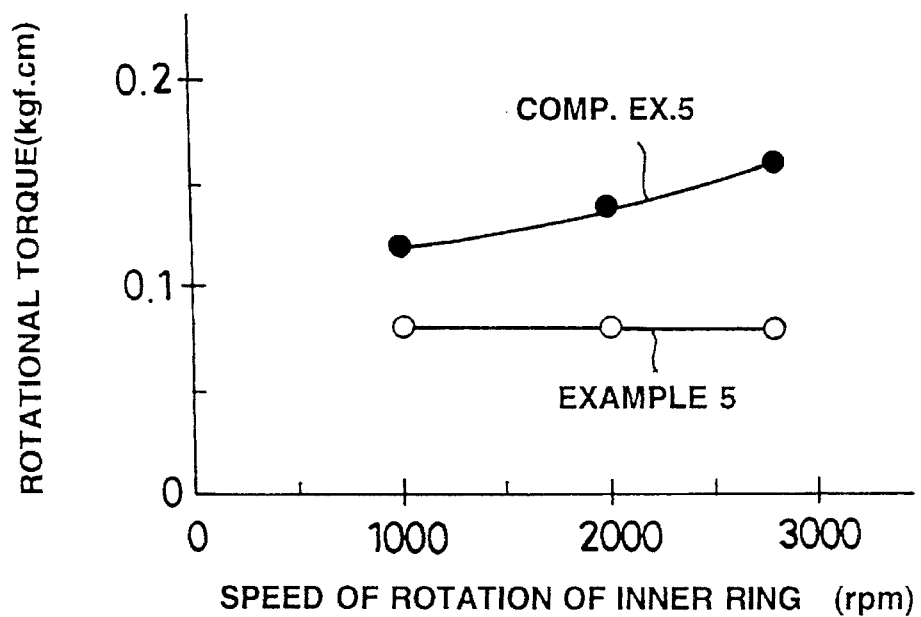
FIG. 12 is a graph showing the results of Example 5 and Comparative Example 5.

The same experiment as in Example 2 was conducted except that the inner ring 3 was rotated at varying speeds to measure the rotational torque at each of the different speeds. Table 1 and FIG. 12 show the result.

COMPARATIVE EXAMPLE 5

The same ball bearing as used in Example 5 except that the cage had no protrusion was tested to measure the rotational torque under the same conditions as above. The result is given also in Table 1 and FIG. 12.

TABLE 1

| Speed of rotation of inner ring | Rotational torque (kgf · cm) | |
| --- | --- | --- |
| (r.p.m.) | Example 5 | Comp. Ex. 5 |
| 1000 | 0.07 (574) | 0.12 (564) |
| 2000 | 0.08 (1170) | 0.14 (1149) |
| 2800 | 0.08 (1619) | 0.18 (1607) |

The value in parentheses in Table 1 is the speed of rotation (r.p.m.) of the outer ring.

Embodiment 2

Figure 13:
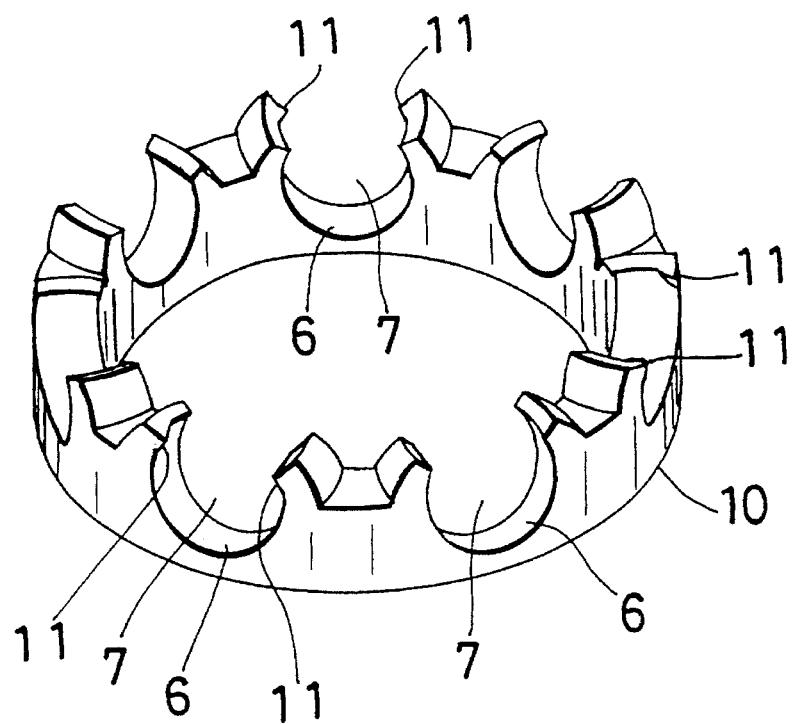
FIG. 13 is a perspective view showing another cage of the invention as Embodiment 2.
Figure 14:
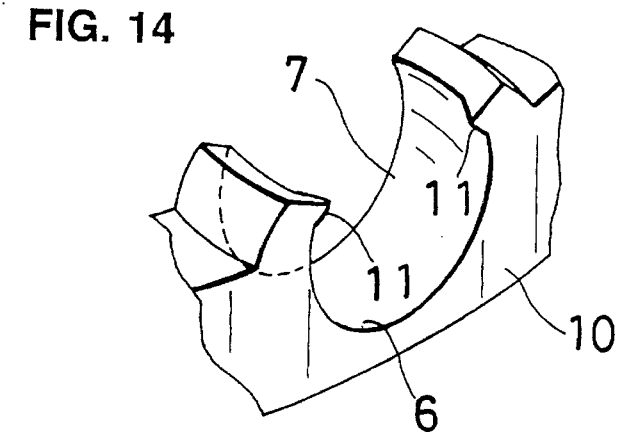
FIG. 14 is an enlarged fragmentary view of FIG. 13.

FIGS. 13 and 14 show this embodiment, i.e., a cage of the invention, which is in the form of a crown and is made of an injection molding of plastics such as nylon 6,6. The cage of this embodiment is for use in ball bearings wherein the inner ring is rotatable.

The cage 10 shown in FIGS. 13 and 14 have pockets 7. Of all the pockets 7, circumferentially spaced pockets 7 each have a protrusion 11 projecting inwardly thereof, formed on the pocket face 6 at each of its opposite ends on the opening side of the pocket 7 and positioned at the edge portion of the pocket face 6 close to the outer ring 2. The protrusion on this edge portion is positioned at each of opposite sides of a plane extending through the center of the pocket 7 and parallel to the axis of the cage.

Like the ball bearing 1 incorporating the cage 4 of Embodiment 1, the ball bearing including the cage 10 also operates without giving off a noise.

In the case of Embodiment 2 wherein the protrusions 11 are formed at the respective ends of the pocket 7 on its opening side, it is slightly difficult to remove the cage 10 from the mold used for injection molding.

The position and number of pockets 7 having the protrusion 11 in Embodiment 2 are suitably variable.

Embodiment 3

Figure 15:
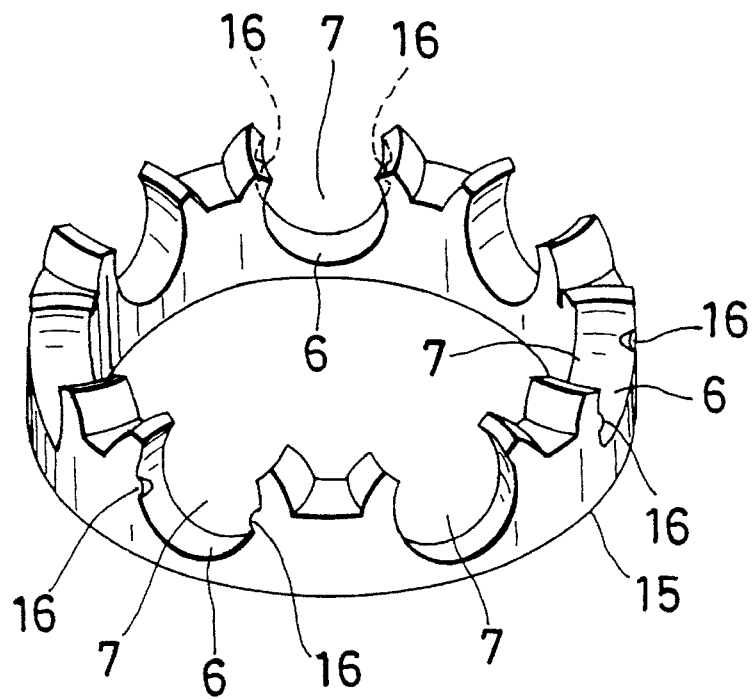
FIG. 15 is a perspective view showing another cage of the invention as Embodiment 3.
Figure 16:
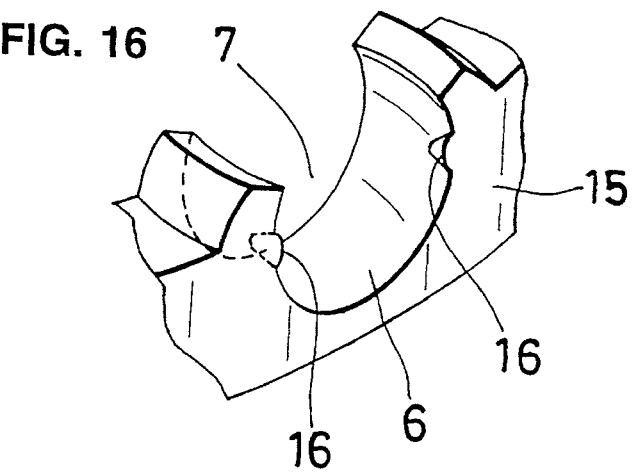
FIG. 16 is an enlarged fragmentary view of FIG. 15.

FIGS. 15 and 16 show this embodiment, which is a crown-shaped cage made of an injection molding of plastics such as nylon 6,6. The cage is for use in ball bearings having a rotatable inner ring.

With reference to FIGS. 15 and 16, of all pockets 7 of the cage 15, those circumferentially spaced each have a protrusion 16 projecting inwardly of the pocket, formed on the pocket face 6 between the innermost part of the pocket face 6 and each of opposite ends thereof on the opening side of the pocket 7, and positioned at the edge portion of the face 6 close to the outer ring 2. The protrusion 16 on this edge portion is positioned at each of opposite sides of a plane extending through the center of the pocket 7 and parallel to the cage axis. The protrusion 16 have the same shape as those of Embodiment 1.

Like the ball bearing 1 incorporating the cage 4 of Embodiment 1, the ball bearing including the cage 15 also operates without giving off a noise.

The position and number of pockets 7 having the protrusions 16 in Embodiment 3 are suitably variable.

Embodiment 4

Figure 17:
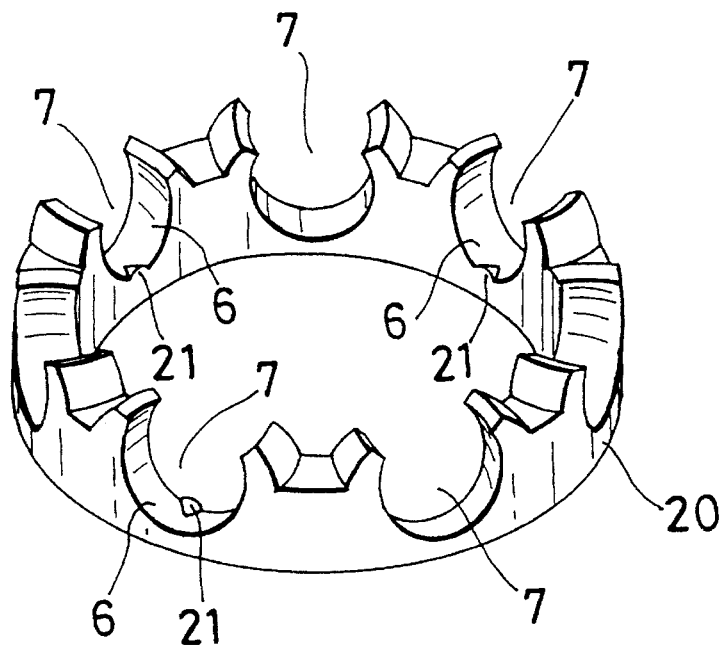
FIG. 17 is a perspective view showing another cage of the invention as Embodiment 4.
Figure 18:
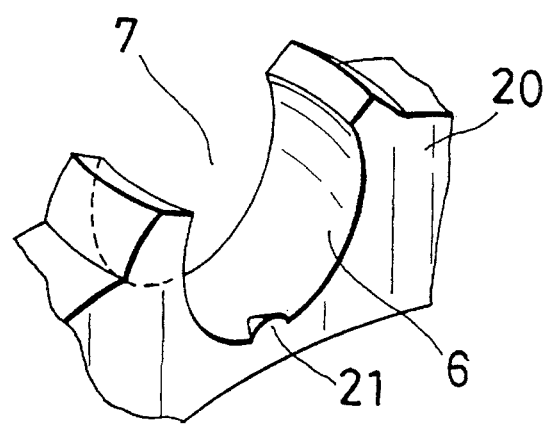
FIG. 18 is an enlarged fragmentary view of FIG. 17.
Figure 19:
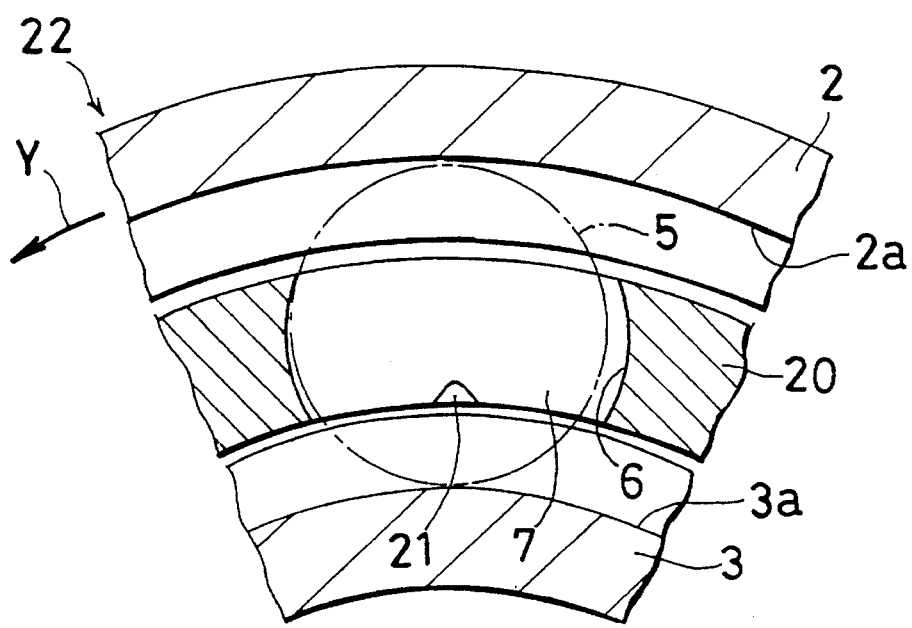
FIG. 19 is a fragmentary view in cross section of a ball bearing of the invention wherein the cage of Embodiment 4 is used.

FIGS. 17 to 19 show this embodiment, which is a crown-shaped cage made of an injection molding of plastics such as nylon 6,6. The cage is for use in ball bearings having a rotatable outer ring.

FIGS. 17 and 18 show the cage, and FIG. 19 shows a ball bearing wherein the cage is used.

With reference to FIGS. 17 and 18, of all pockets 7 of the cage 20, those circumferentially spaced each have a protrusion 21 projecting inwardly thereof and formed on the innermost part of the pocket face 6 integrally therewith at the edge portion thereof close to the inner ring 3. When seen from the opening side of the pocket 7, the protrusion 21 is in the form of a triangle having a base on the inner ring (3) side. The protrusion 21 has a height gradually decreasing from the inner ring (3) side toward the outer ring (2) side, and has a conical surface. Since the balls 5 are retained in raceway grooves 3a, 2a in the inner and outer rings 3, 2 as in the case of Embodiment 1 although not illustrated, the protrusions 21 act to position the cage 20 as axially displaced from the position thereof when the protrusions 21 are absent.

With reference to FIG. 19, the outer ring 2 rotates in the direction of arrow Y while the ball bearing 22 thus constructed is in use. At a front portion (at left in FIG. 19) of the outer ring 2 with respect to the direction of rotation of the ring 2, the edge portion of pocket face 6 of each pocket 7 adjacent to the outer ring 2 then comes into contact with the ball 5, and the clearance between the pocket face 6 and the ball 5 gradually increases from the outer ring (2) side toward the inner ring (3) side. Accordingly, at the front portion of the outer ring 2 toward the direction of rotation thereof, the lubricant adhering to the ball 5 outside the pocket 7 is partly scraped off by the pocket face edge portion adjacent to the outer ring 2. The portion of lubricant ingressing into the clearance rapidly passes through the clearance and egresses therefrom toward the inner ring 3. Consequently, the sliding contact of the ball 5 with the pocket face 6 in the presence of lubricant encounters reduced resistance, whereby generation of noise is precluded.

According to Embodiment 4 described, the protrusion 21 is formed on the innermost portion of the pocket face 6 at the edge portion thereof adjacent to the inner ring, whereas even when the cage is to be used in a ball bearing having a rotatable outer ring, the protrusion may alternatively be formed at each of opposite ends of the pocket 7 on the opening side thereof at the edge portion of the pocket face 6 adjacent to the inner ring 3, or between the innermost portion and the above-mentioned each end.

Further with Embodiment 4 described, the position and number of pockets 7 having the protrusion 21 can be altered suitably. In the case where one protrusion 21 is formed in only one pocket 7, the protrusion 21 is liable to wear away and become ineffective for preventing generation of noise when worn, so that it is desirable to form the protrusion 21 in a plurality of pockets 7.

Embodiment 5

Figure 20:
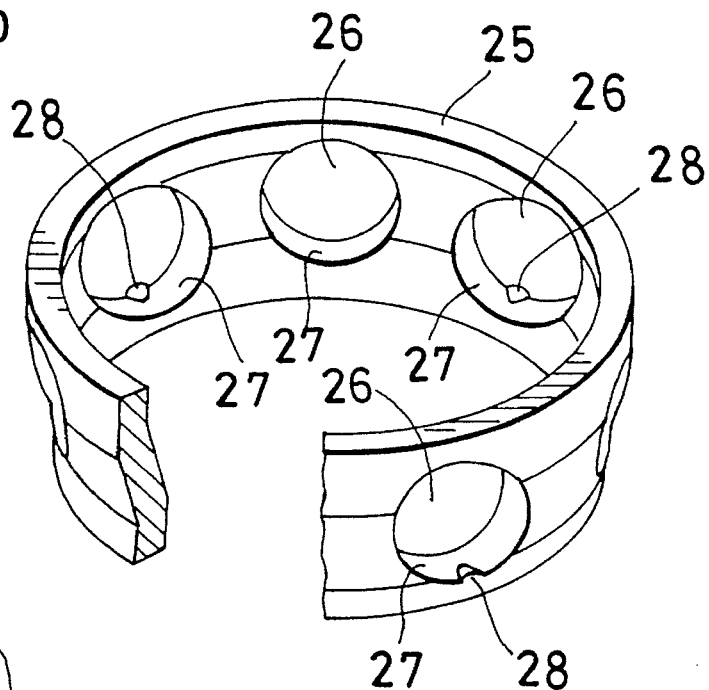
FIG. 20 is a perspective view partly broken away and showing another cage of the invention as Embodiment 5.
Figure 21:
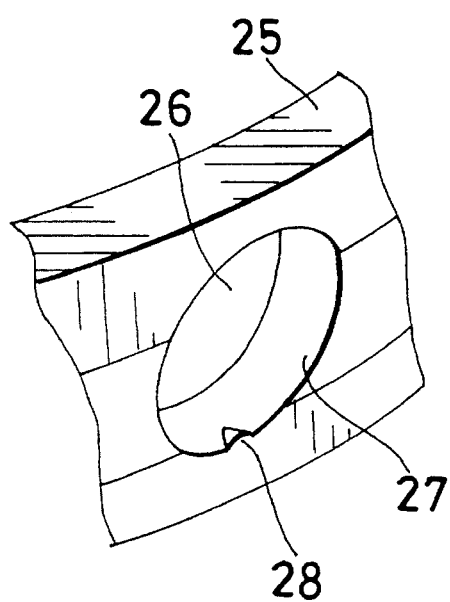
FIG. 21 is an enlarged fragmentary view of FIG. 20.

FIGS. 20 and 21 show this embodiment, which is an annular molded cage prepared by injection molding of plastics such as nylon 6,6 and having a plurality of pockets each in the form of a through hole. The cage is for use in angular ball bearings having a rotatable inner ring.

With reference to FIGS. 20 and 21, the cage 25 is formed with pockets 26 each having an inwardly curved spherical pocket face 27 which is similar to balls 5 in shape and slightly larger than the ball 5 in the radius of curvature. Of all the pockets 26, those circumferentially spaced each have a protrusion 28 projecting inwardly thereof, formed on the pocket face 27 at the edge part thereof close to the outer ring 2 and positioned at one end of the face with respect to the axial direction of the cage. The protrusion 28 has the same shape as in the case of Embodiment 1.

Like the ball bearing 1 incorporating the cage 4 of Embodiment 1, the ball bearing including the cage 25 also operates without giving off a noise.

The protrusion may be provided at each of opposite sides of a plane extending through the center of the pocket 26 and parallel to the axis of the cage also in the case of the annular molded cage.

With Embodiment 5 described, the position and number of pockets 26 having the protrusion 28 can be altered suitably. In the case where one protrusion 28 is formed in only one pocket 26, the protrusion 28 is liable to wear away and become ineffective for preventing occurrence of noise when worn, so that it is desired to form the protrusion 28 in a plurality of pockets 26.

The annular molded cage 25 of Embodiment 5 is adapted for use in ball bearings wherein the inner ring is rotatable. When the cage is to be used in ball bearings wherein the outer ring is rotatable, the protrusion is formed on the pocket face 27 at the edge portion thereof close to the inner ring 3.

Embodiment 6

Figure 22:
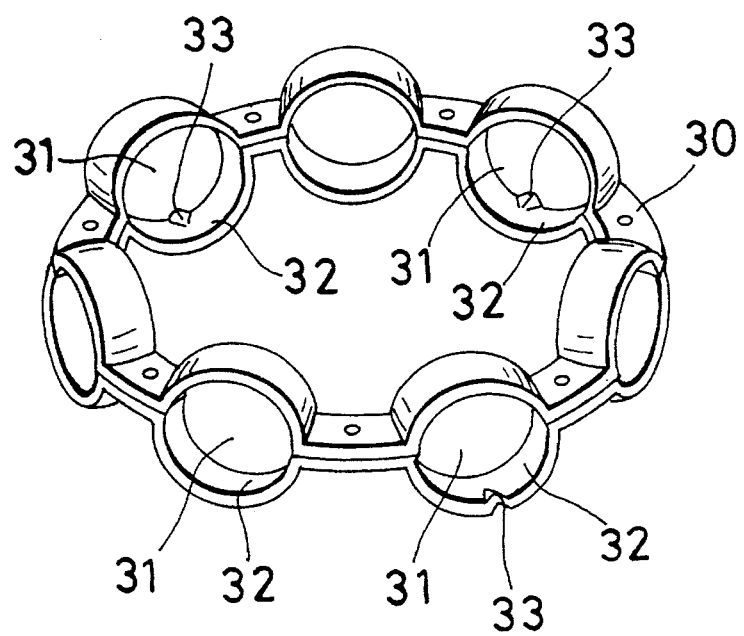
FIG. 22 is a perspective view showing another cage of the invention as Embodiment 6.
Figure 23:
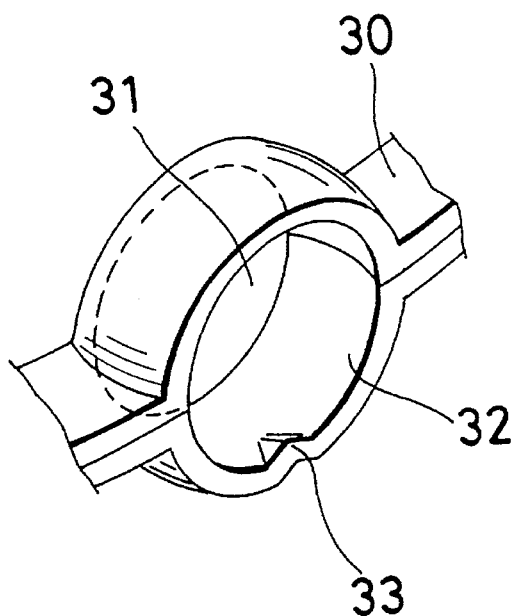
FIG. 23 is an enlarged fragmentary view of FIG. 22.
Figure 24:
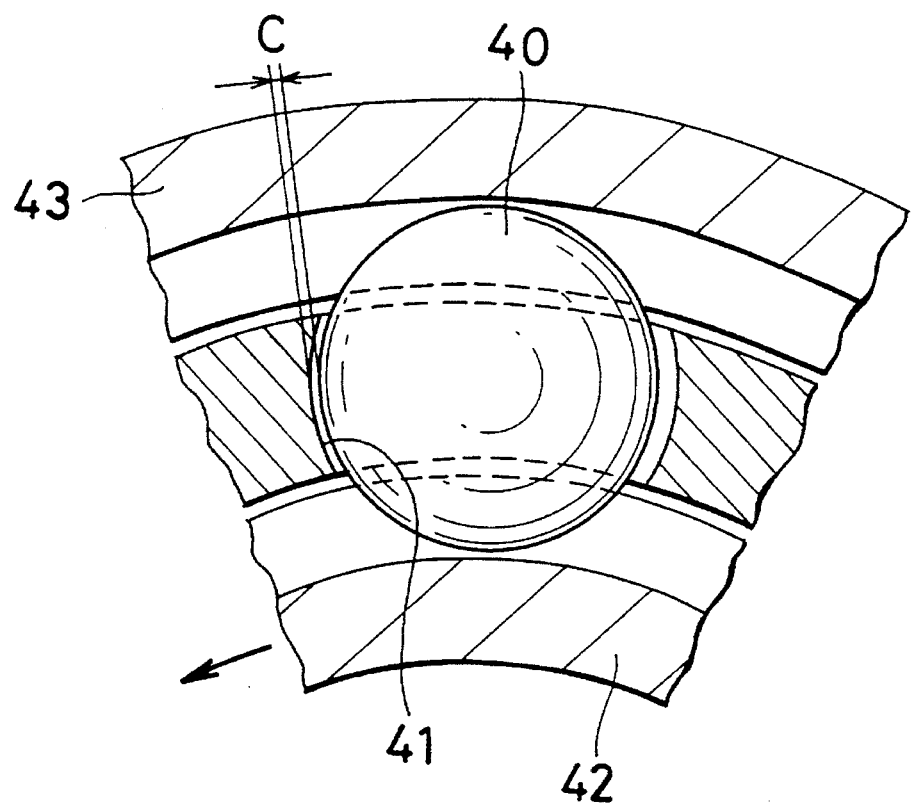
FIG. 24 is a fragmentary view in cross section of a ball bearing wherein a conventional cage is used.

FIGS. 22 and 23 show this embodiment, which is a ribbon-type pressed cage of metal such as SPB steel or SPC steel. The cage of this embodiment is for use in ball bearings wherein the inner ring is rotated.

With reference to FIGS. 22 and 23, the cage 30 is formed with a plurality of pockets 31 each having an inwardly curved spherical pocket face 32 which is similar to balls 5 in shape and slightly larger than the ball 5 in the radius of curvature. Of all the pockets 31, those circumferentially spaced each have a protrusion 33 projecting inwardly thereof, formed on the pocket face 32 at the edge portion thereof close to the outer ring 2 and positioned at one end of the face with respect to the axial direction of the cage. The protrusion 33 has the same shape as in the case of Embodiment 1.

Like the ball bearing 1 incorporating the cage 4 of Embodiment 1, the ball bearing including the cage 30 also operates without giving off a noise.

The protrusion may be provided at each of opposite sides of a plane extending through the center of the pocket 31 and parallel to the axis of the cage also in the case of the ribbon-type pressed cage.

With Embodiment 6 described, the position and number of pockets 31 having the protrusion 33 can be altered suitably.

The ribbon-type pressed cage 30 of Embodiment 6 is adapted for use in ball bearings wherein the inner ring is rotatable, whereas when the cage is to used in ball bearings wherein the outer ring is rotated, the protrusion is formed on the pocket face 32 at the edge portion thereof close to the inner ring 3.

What is claimed is:

1. A ball bearing cage formed with a plurality of pockets each having an inwardly curved spherical pocket face similar to a ball in shape, at least one of all the pockets having a protrusion projecting inwardly thereof from one of inner and outer circumferential edge portions of the pocket face.

2. A ball bearing cage as defined in claim 1 which is in the form of a crown, the protrusion being formed at the innermost portion of the pocket.

3. A ball bearing cage as defined in claim 2 which is made of an injection molding of plastics.

4. A ball bearing cage as defined in claim 1 which is made of an injection molding of plastics.

5. A ball bearing cage as defined in claim 1 which is a ribbon-type pressed cage, the protrusion being formed at one end of the pocket with respect to an axial direction of the cage.

6. A ball bearing cage as defined in claim 5 which is made of a metal.

7. A ball bearing cage as defined in claim 1 wherein the protrusion is formed at each of opposite sides of a plane extending through the center of the pocket and parallel to the axis of the cage.

8. A ball bearing cage as defined in claim 1 which is annular molded cage, the plurality of pockets being each in the form of a through hole, the protrusion being formed at one end of the pocket with respect to an axial direction of the cage.

9. A ball bearing cage as defined in claim 8, which is made of an injection molding of plastics.

10. A ball bearing comprising a plurality of balls retained between inner and outer bearing rings and equispaced circumferentially thereof by a cage, the cage being formed with a plurality of pockets each having an inwardly curved spherical pocket face similar to the ball in shape, at least one of all the pockets having a protrusion projecting inwardly thereof from an edge portion of the pocket face close to the fixed one of the inner and outer rings.

11. A ball bearing as defined in claim 10 wherein the cage is made of an injection molding of plastics.

12. A ball bearing as defined in claim 10 wherein the cage is a ribbon-type pressed cage, and the protrusion is formed at one end of the pocket with respect to an axial direction of the cage.

13. A ball bearing as defined in claim 12 wherein the cage is made of a metal.

14. A ball bearing as defined in claim 10 wherein the protrusion is formed at each of opposite sides of a plane extending through the center of the pocket and parallel to the axis of the cage.

15. A ball bearing as defined in claim 10 wherein the cage is in the form of a crown, and the protrusion is formed at the innermost portion of the pocket.

16. A ball bearing as defined in claim 15 wherein the cage is made of an injection molding of plastics.

17. A ball bearing as defined in claim 10 wherein the cage is an annular molded cage, and the plurality of pockets are each in the form of a through hole, the protrusion being formed at one end of the pocket with respect to an axial direction of the cage.

18. A ball bearing as defined in claim 17 wherein the case is made of an injection molding of plastics.

* * * * *